United States Patent
Brown et al.

(10) Patent No.: US 7,752,135 B2
(45) Date of Patent: Jul. 6, 2010

(54) CREDIT AUTHORIZATION SYSTEM AND METHOD

(75) Inventors: Michael Wayne Brown, Georgetown, TX (US); Rabindranath Dutta, Los Angeles, CA (US); Michael A. Paolini, Austin, TX (US); Newton James Smith, Jr., Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1796 days.

(21) Appl. No.: 10/046,997

(22) Filed: Jan. 16, 2002

(65) Prior Publication Data

US 2003/0135463 A1    Jul. 17, 2003

(51) Int. Cl.
    *G06Q 40/00* (2006.01)
(52) U.S. Cl. .................................... 705/44
(58) Field of Classification Search .......... 705/16, 705/17, 35, 39, 44, 67; 902/22; 379/207.12, 379/207.13; 726/4, 5, 26, 27, 30
    See application file for complete search history.

(56) References Cited

U.S. PATENT DOCUMENTS

| 5,565,857 | A |  | 10/1996 | Lee |
| 5,615,110 | A |  | 3/1997 | Wong |
| 5,903,830 | A |  | 5/1999 | Joao et al. |
| 5,914,472 | A |  | 6/1999 | Foldare et al. |
| 5,991,749 | A |  | 11/1999 | Morrill, Jr. |
| 6,084,967 | A |  | 7/2000 | Kennedy et al. |
| 6,157,825 | A |  | 12/2000 | Frederick |
| 6,157,935 | A | * | 12/2000 | Tran et al. .................. 715/202 |
| 6,370,629 | B1 | * | 4/2002 | Hastings et al. ............ 711/163 |
| 6,515,595 | B1 | * | 2/2003 | Obradovich et al. ........ 340/905 |
| 6,612,488 | B2 | * | 9/2003 | Suzuki ...................... 235/380 |
| 6,868,391 | B1 | * | 3/2005 | Hultgren .................... 705/26 |
| 6,941,129 | B2 | * | 9/2005 | Marce et al. ............ 455/414.1 |
| 6,985,588 | B1 | * | 1/2006 | Glick et al. ................. 380/258 |
| 7,143,289 | B2 | * | 11/2006 | Denning et al. ............ 713/168 |
| 2001/0051920 | A1 | * | 12/2001 | Joao et al. ................... 705/41 |
| 2002/0023010 | A1 | * | 2/2002 | Rittmaster et al. ........... 705/26 |
| 2002/0023215 | A1 | * | 2/2002 | Wang et al. ................ 713/171 |
| 2002/0108062 | A1 | * | 8/2002 | Nakajima et al. .......... 713/201 |
| 2002/0174062 | A1 | * | 11/2002 | Sines et al. .................. 705/39 |
| 2003/0135463 | A1 | * | 7/2003 | Brown et al. ................. 705/44 |
| 2004/0205194 | A1 | * | 10/2004 | Sahai ......................... 709/228 |

* cited by examiner

*Primary Examiner*—Jagdish N Patel
*Assistant Examiner*—Kenneth Bartley
(74) *Attorney, Agent, or Firm*—Yee & Associates, P.C.; Libby Z. Toub

(57) ABSTRACT

A system and method for preventing credit card fraud by comparing the location of a given transaction with the location of a predetermined communication device is provided.

13 Claims, 3 Drawing Sheets

FIG. 1

POINT OF SALE TERMINAL 102

DEVICE ID DATABASE 106

104  LIMIT 108

110

COMMUNICATION DEVICE 112

DEVICE ID 114

| IN USE | DEVICE ID | NICKNAME |
|---|---|---|
| | 512-823-1234 | My Mobile Phone |
| X | 888-555-1212 | My pager |
| | 713-345-7890 | Junior's mobile phone |
| | NONE | |
| | 512-555-4568 | My home phone |

CREDIT AUTHORIZATION SYSTEM AND METHOD

FIELD OF THE INVENTION

The present invention relates to a system and method for preventing credit card fraud by comparing the location of a given transaction with the location of a predetermined communication device.

BACKGROUND OF THE INVENTION

Millions of individuals enjoy the convenience of utilizing transaction cards such as credit cards, charge cards, debit cards, and/or currency or "smart" cards as a convenient way in which to purchase goods and/or services. By utilizing transaction cards, an individual may enter into a transaction without having to have cash or currency in hand or otherwise. In the case of credit cards and charge cards, the individual, in effect obtains an instant loan of the funds needed to make a purchase and/or enter into a transaction. In the case of currency or "smart" cards, the individual may "store" an amount of money on the card(s) and, thereafter, utilize the card(s), instead of cash or currency, in order to make purchases and/or enter into transactions.

Millions of individuals also enjoy the benefits of having savings accounts, checking accounts and/or automated teller machine accounts which allow them to enjoy the security of saving their money in accounts which are usually insured and which allow them to, in some instances, earn interest on their money. In the case of checking accounts, individuals enjoy the convenience of writing checks and/or other transaction instruments which allow them to draw against their money without having to undergo the inconvenience of going to the bank or financial institution to withdraw their money, in currency form, and traveling to, in some cases, a distant location to either make a purchase, payment and/or to otherwise settle an account. In this regard, the ability to write checks, drafts and/or other instruments against an account is a very convenient manner in which to conduct transactions of any kind.

Many individuals also enjoy the convenience of owning and/or using wireless, mobile or cellular telephones or devices as a means by which to make telephone calls when a conventional line or permanent telephone is not within reach and/or when the individual is "on the go", such as in an automobile, on foot, and/or in any other type of environment, such as away from home, when a conventional line or permanently fixed telephone is not available.

Unfortunately, with the convenience of each of the above credit cards, charge cards, debit cards, and/or currency or "smart" cards, savings accounts, checking accounts, automated teller machine accounts, and cellular telephones or cellular communications devices, comes many disadvantages and the opportunity for theft and/or fraud. In the case of credit cards, charge cards and/or debit cards, hundreds of millions, if not billions, of dollars a year are lost as a result of the theft of, and/or the fraudulent use of, credit cards, charge cards and/or debit cards, or the account numbers which correspond thereto.

A lost or stolen card may be utilized by an unauthorized individual to spend upwards of thousands of dollars before the unauthorized use is detected and/or before the cardholder can ascertain, and/or be notified, either by the card issuer or servicing institution or when the cardholder detects the unauthorized transaction on his or her monthly account statement, that the card is lost or stolen. Similarly, even in the absence of the physical card, an unauthorized individual may utilize the account number which corresponds to the card in order to make certain transactions, for example by telephone or the Internet.

While card holders are usually protected by various types of coverage which shield them from the liabilities associated with the fraudulent use of a card or the corresponding account number, the card issuers, credit, charge and/or debit card issuing companies and/or institutions, and/or their insurance companies end up paying for the above described thefts and/or fraudulent and/or unauthorized uses. Ultimately, the consumer also shoulders the burden of the costs associated with these thefts and/or fraudulent and/or unauthorized uses in the form of increased prices.

While authorization terminals and/or devices are utilized at a point-of-sale and/or at the vendor's, the seller's, or the service provider's, location, these authorization terminals and/or devices typically are utilized to obtain an authorization from the card issuer or account servicing institution, which usually entails a screening of whether the card has been lost, stolen, cancelled, de-activated and/or whether the cardholder has exceeded and/or will exceed his or her credit limit. This current authorization practice fails to prevent the use of a lost or stolen card, or the unauthorized use of either the card or the account number corresponding thereto, if the card has not been reported, and/or discovered, to be, lost, stolen or used without authorization and/or if the account credit limit has not yet been reached.

Current practices do not entail and/or do not include the provision for obtaining an authorization, and/or for providing notice to the cardholder before, during and/or shortly after a transaction, which cardholder authorization and/or notification procedure would be helpful and prove to be essential in preventing the fraudulent use and/or unauthorized use of a card and/or the account number corresponding thereto, in an unauthorized transaction and/or shortly after an unauthorized transaction has occurred, thereby minimizing the fraudulent and/or unauthorized use of the card and/or the account number corresponding thereto.

In the case of currency or "smart" cards, which typically may serve as bearer instruments, the monetary credit on these cards may be completely depleted before the card owner even discovers same to be lost or stolen.

In the case of savings accounts, checking accounts, and/or automated teller machine accounts, these accounts may be accessed, and funds be withdrawn, without the account owner's notification and/or knowledge. In the case of savings accounts and checking accounts, these accounts may be accessed, and/or funds may be withdrawn therefrom, when checks drawn on insufficient funds are returned, and/or when the account number is inadvertently and/or fraudulently utilized in an endorsement, or otherwise, by an individual attempting to cash or perform a transaction with a fraudulent instrument, a forged instrument and/or an otherwise "bad" check. In these instances, the accounts and/or funds involved are usually accessed, invaded, and/or withdrawn from the account involved without the account owner being notified and/or having a say in the matter.

The account owners are typically notified of the above-described activity involving their account days later when they either receive a mailed notice and/or when they receive and review their monthly or periodic statement, which notice may be received at a time when it may be too late for the account owner to stop or reverse the transaction and/or, in the case of a check or draft returned for insufficient funds, at a time which is too late for the account owner to attempt to collect the funds. In the case of automated teller machine accounts, these accounts may be accessed, such as with a lost, stolen, or counterfeit card and/or with a card account number(s) and/or associated personal identification number(s), by a thief or by any other unauthorized person who could then make an unauthorized withdrawal(s) therefrom.

Once again, account owners would not receive notification and/or have knowledge of the unauthorized transaction until they are notified by the bank or financial institution either via a monthly and/or periodic statement, and/or when they attempt a transaction at the automated teller machine and, at that time, discover that funds are missing and/or have been withdrawn. In the case of savings accounts, checking accounts and/or automated teller machine accounts, there is no present apparatus or method by which to link the location of a communication device with authorization of a transaction.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 1 is a block diagram of a network suitable for use in the present invention;

FIG. 4 is a block diagram of an exemplary database 106 found in FIG. 1.

SUMMARY OF THE INVENTION

Figure 2:
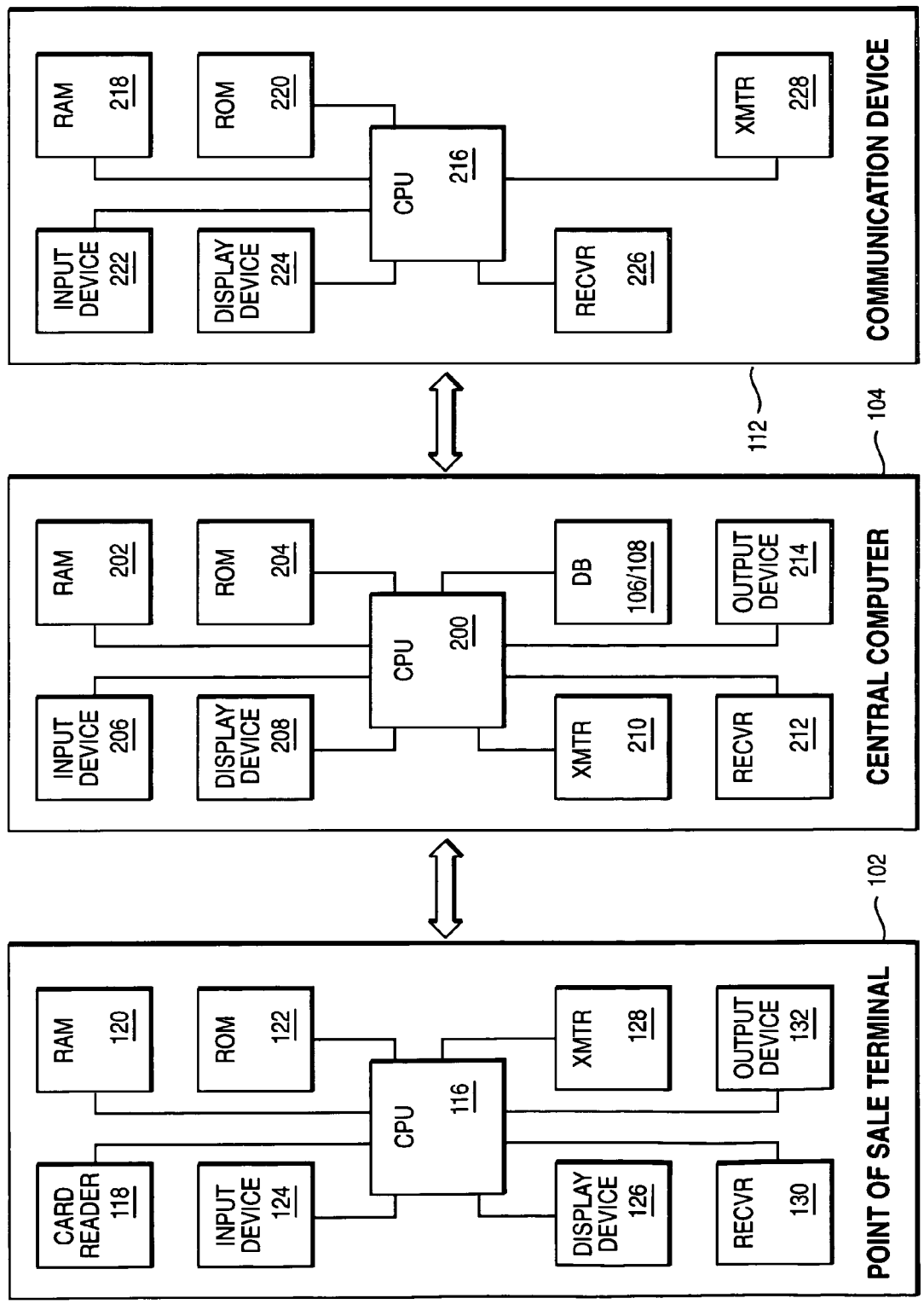
FIG. 2 is a block diagram of components found in FIG. 1.

One aspect of the present invention relates to a method for authorizing transactions against an account. The account may be a credit, debit or other transaction account. A transaction is received that includes a request for authorization to charge an amount against the account. An ID for a communication device associated with the account is retrieved and the location of the communication device is determined. The location of the transaction is determined and compared with the location of the device. The request is then processed based on the location information received. The request is preferably denied when the location of the transaction is different from the location of the device. Alternatively, the request preferably is authorized when the location of the transaction is the same as the location of the device.

A system for authorizing transactions against an account is also provided. The system includes an input device adapted to receive a transaction that includes a request for authorization to charge an amount against the account. A means for retrieving an ID for a communication device associated with the account is provided. The input device is coupled for data communications with the retrieving means. A means for determining the location of the communication device, a means for determining the location of the transaction, a means for comparing the location of the transaction with the location of the device, and a means for processing the request are also provided.

All objects, features, and advantages of the present invention will become apparent in the following detailed written description.

DETAILED DESCRIPTION OF THE INVENTION

The present invention is directed to a system and method for reducing fraudulent transactions involving credit or debit type transaction cards. Briefly, the location of the transaction is compared to the real time physical location of a pre-defined communication device. Where the locations are the same, the transaction is authorized and where the locations are not the same, the transaction is denied. A transaction card account holder may set one or more device locations for verifying the location of the card holder at the time of a transaction.

With reference now to the figures, and, in particular, with reference now to FIG. 1, there is depicted a block diagram of a network environment in which the present invention may be implemented. While the present invention is described with reference to one type of network environment, it will be understood by one with skill in the art that the present invention may be implemented in alternate types of network environments.

FIG. 1 is a schematic diagram of a network in accordance with one embodiment of the present invention. The figures describe the present invention with reference to a merchant transaction however, it should be noted that the invention is applicable to transactions where a merchant is not present, for example, a transaction at an automated teller machine. A transaction card is initially read at a point of sale terminal 102 at a merchant's location. The point of sale terminal 102, contacts a transaction service provider or central computer 104, typically via a telephone call. When the phone call is connected, the point of sale terminal 102 initializes communication with the service provider central computer 104. The service provider typically validates the transaction card. This may include checking with the actual card issuer to make sure the proposed procurement would not exceed predetermined maximum purchase limits. The central computer 104 may contain a database 106 containing at least one device ID 114 for an account holder's communication device 112 and optionally a database 108 containing card limits.

The point-of-sale authorization terminal 102 may be any of the widely used and well known terminals or devices for providing point-of-sale authorization for transactions involving credit cards, charge cards, debit cards and/or other currency or "smart" cards. The point-of-sale terminal 102 may be utilized at the location of the goods and/or service provider, such as the retail store or office, automated teller machine, and/or a self-serve vendor location, for example a gas pump or vending machine.

Typically, the terminals and devices for providing point-of-sale authorization comprise and utilize a magnetic card reader and/or magnetic strip card reader, for reading data from transaction cards. The point-of-sale terminal 102 transmits an authorization request which may include the data pertaining to the particular card utilized in the transaction and the amount of the transaction, over a communications medium, to a central processing computer for processing the transaction request and/or the authorization request pertaining thereto.

The point-of-sale terminal 102 also receives the authorization and/or authorization data and/or information from the central processing computer 104. A printed transaction receipt may also be provided at and/or obtained via the point-of-sale terminal 102, or peripheral device associated therewith, for printing a transaction receipt which is usually or typically signed by the card holder in completing the transaction. The point-of-sale terminal 102 may be designed to read other data besides and/or in addition to magnetic card data. The point-of-sale terminal 102 may also comprise, or have associated therewith, a keypad for the manual entry of transaction information and/or data, such as the amount of the transaction. The point-of-sale terminal 102 may also be an integral component of a cash register or other transaction terminal or device which may provide for the automatic entry of transaction information and/or data.

The central processing computer 104 may service any predefined group of cardholders. For example, the central processing computer 104 may handle all MASTERCARD transactions for a given financial and/or credit institution. The central processing computer 104, for example, may process transaction cards such as, credit cards, charge cards, debit cards, and/or currency or "smart" cards and/or combinations of same, for example, VISA, MASTERCARD, and/or AMERICAN EXPRESS cards and process and/or mange account information pertaining thereto. The central processing computer 104 may also process accounts for any of the various banks and/or financial institutions which issue and/or manage credit cards, charge cards, debit cards and/or currency or "smart" cards (hereinafter referred to as "card" or "cards") and/or process or manage these accounts.

The central processing computer 104 may be a mainframe computer, a mini-computer, a micro-computer, a server computer, such as those utilized in conjunction with on-line services and/or in a network environment, and/or any other suitable computer or computer system.

In the preferred embodiment, the point-of-sale terminal 102 is linked and/or connected to the central processing computer 104 via a telecommunications system, link and/or medium (hereinafter referred to as "communications system") such as, for example, a telephone network or line. It is important to note that the communications system which is utilized may be any communications system and may include telecommunication systems, satellite communications systems, radio communication systems, digital communications systems, digital satellite communications systems, personal communications services (PCS) communication systems, as well as any other appropriate communications system. The point-of-sale terminal 102 transmits signals and/or data to the central processing computer 104 as well as receives signals and/or data from the central processing computer 104.

The network shown in FIG. 1 also comprises a cardholder communication device 112 which may receive signals and/or data from the point-of-sale terminal 102 and/or the central processing computer 104. Communication device 112 has a device ID 114 associated therewith. In the preferred embodiment of FIG. 1, the communication device 112 receives signals and data from the central processing computer 104 with said signals being transmitted via a suitable communication system 110. In the preferred embodiment, the communications system 110 utilized for transmitting signals and/or data to the communication device 112 is a wireless telephone line and the communication device 112 is a telephone signal receiving device such as a telephone beeper or pager. The communication device 112 or pager receives the wireless telephone signals and/or data from the central processing computer 104 during the authorization procedure as will be described in more detail below.

In the preferred embodiment, the communication device 112 is also equipped with a transmitter for transmitting signals and/or data to the central processing computer 104. In this regard, the central processing computer 104 transmits signals and/or data to the communication device 112 as well as receives signals and/or data from the communication device 112. The communication device 112 may also transmit signals and/or data directly to the point-of-sale terminal 102 and receive signals and/or data directly from the point-of-sale terminal 102. In the preferred embodiment, the point-of-sale terminal 102 transmits signals and/or data to the central processing computer 104 and receives signals and/or data from the central processing computer 104. Further, in the preferred embodiment, the communication device 112 receives signals and/or data from the central processing. computer 104 and transmits signals and/or data to the central processing computer 104.

In particular, the communication device 112 is adapted to transmit its physical location to the central computer. Communication device 112 may contain a Global Positioning System (GPS) device, whereby the device 112 can transmit its location to the central processing computer 104. Alternatively, the communication device 112 may be a telephone or pager which is part of a communication system equipped with location capabilities such as Enhanced 911. In this instance, the communication system is capable of determining the location of the device 112 and sending this information to the central computer 104. The merchant's location may be verified through the vendor ID that is typically transmitted to the central computer 104 along with the transaction information. In the case where the account holder is purchasing goods or services with a vendor over the phone or via the Internet, the merchant location information can be changed to the location of the account holder, such that the two locations will match. To effect the change in merchant location, the account holder may enter a unique character string or code to notify the central computer 104, that the merchant location should be changed. The merchant location may be changed to the account holder's current location as verified by their communication device 112, or a default "home" setting may be used. Account holders may change the required character string or code at random, in order to prevent others from using their transaction card in these types of purchases.

As noted above, the communication device 112 is preferably a wireless device. In this regard, the communication device 112 or pager may be carried by the cardholder and/or be kept on and/or close to the cardholder's person so that the central processing computer 104 may transmit signals and/or data to the communication device 112 so as to communicate and physically locate the cardholder at any time.

FIG. 2 illustrates the various components of the apparatus shown in FIG. 1 where like numbers are used for like elements. In FIG. 2, the point-of-sale terminal 102, in the preferred embodiment, comprises a central processing unit or CPU 116, a magnetic card reader 118, which is connected to the CPU 116, associated random access memory 120 (RAM) and read only memory 122 (ROM) devices, which are also connected to the CPU 116, a user input device 124, which is typically a keypad or other suitable input device for inputting data into the terminal 102 and which is also connected to the CPU 116, and a display device 126 for displaying information and/or data to a user.

The point-of-sale terminal 102 also comprises a transmitter 128 for transmitting signals and/or data to the central processing computer 104, and/or to the communication device 112 and/or to any other device associated with the cardholder and/or the apparatus, if desired. The transmitter 128 is also connected to the CPU 116. The point-of-sale terminal 102 also comprises a receiver 130 for receiving signals and/or data from the central processing computer 104, and from the communication device 112 and/or any other associated device which may be utilized, if desired. The receiver 130 is also connected to the CPU 116. The point-of-sale terminal 102 may also comprise a printer 132 or other appropriate output device for outputting data to the user. The printer 132 is also connected to the CPU 116.

In FIG. 2, the central processing computer 104, in the preferred embodiment, comprises a central processing unit or CPU 200, associated random access memory 202 (RAM) and read only memory 204 (ROM) devices, which are connected to the CPU 200, a user input device 206, which is a keypad and/or any other suitable input device for inputting data into the central processing computer 104 and which is also connected to the CPU 200 and a display device 208 for displaying information and/or data to a user or operator.

The central processing computer 104 also comprises a transmitter(s) 210 for transmitting signals and/or data to the point-of-sale terminal 102 and to the communication device 112. The transmitter(s) 210 is also connected to the CPU 200. The central processing computer 104 also comprises a receiver(s) 212 for receiving signals and/or data from the point-of-sale terminal 102 and from the communication device 112 and/or from any other suitable device which may be utilized in conjunction with the apparatus 1. The receiver(s) 212 is also connected to the CPU 200. The central processing computer 104, in any and/or all of the embodiments described herein, may utilize a fax/modem and/or any other suitable computer communication device.

The central processing computer also comprises databases 106, 108 which contains account information and data pertaining to the cardholders and/or to the cardholder accounts. The databases 106, 108 contain information about the cardholder, the cardholders account number, credit and/or account limits, communication device ID's and other information and/or data necessary to manage and/or process an account transaction as described herein. The databases 106, 108 are also connected to the CPU 200. The central processing computer 104 may also comprise a printer 214 or other appropriate output device for outputting information and/or data to a user or operator.

In FIG. 2, the communication device 112, in the preferred embodiment, comprises a central processing unit or CPU 216, associated random access memory 218 (RAM) and read only memory 220 (ROM) devices, which are connected to the CPU 216, a user input device 222, which is a keypad or a plurality of keys and/or switches for inputting data into the communication device 112 and which is also connected to the CPU 216, and a display device 224, for displaying information and/or data to the cardholder which is also connected to the CPU 216. The communication device 112 also comprises a receiver 226 for receiving signals and/or data from the central processing computer 104 and/or point of sale terminal 102 and which is also connected to the CPU 216, a transmitter 228 for transmitting signals and/or data to the central processing computer 104 and/or point of sale terminal 102 and which is also connected to the CPU 216.

In the preferred embodiment, the communication device 112 is a mobile phone or a personal digital assistant (PDA) with location identification capabilities. A two-way pager and/or pager systems may also be utilized for implementing the respective component system(s) in the communication device 112/central processing computer 104 combination and/or link.

The system of the present invention may be utilized in order to facilitate authorization, and/or security measures in financial transactions involving credit cards, charge cards, debit cards, and/or currency or "smart" cards, in the manner described below and with reference to FIG. 1. In this manner, the method and system of the present invention may be utilized to verify the location of the cardholder in a card-related transaction.

Figure 3:
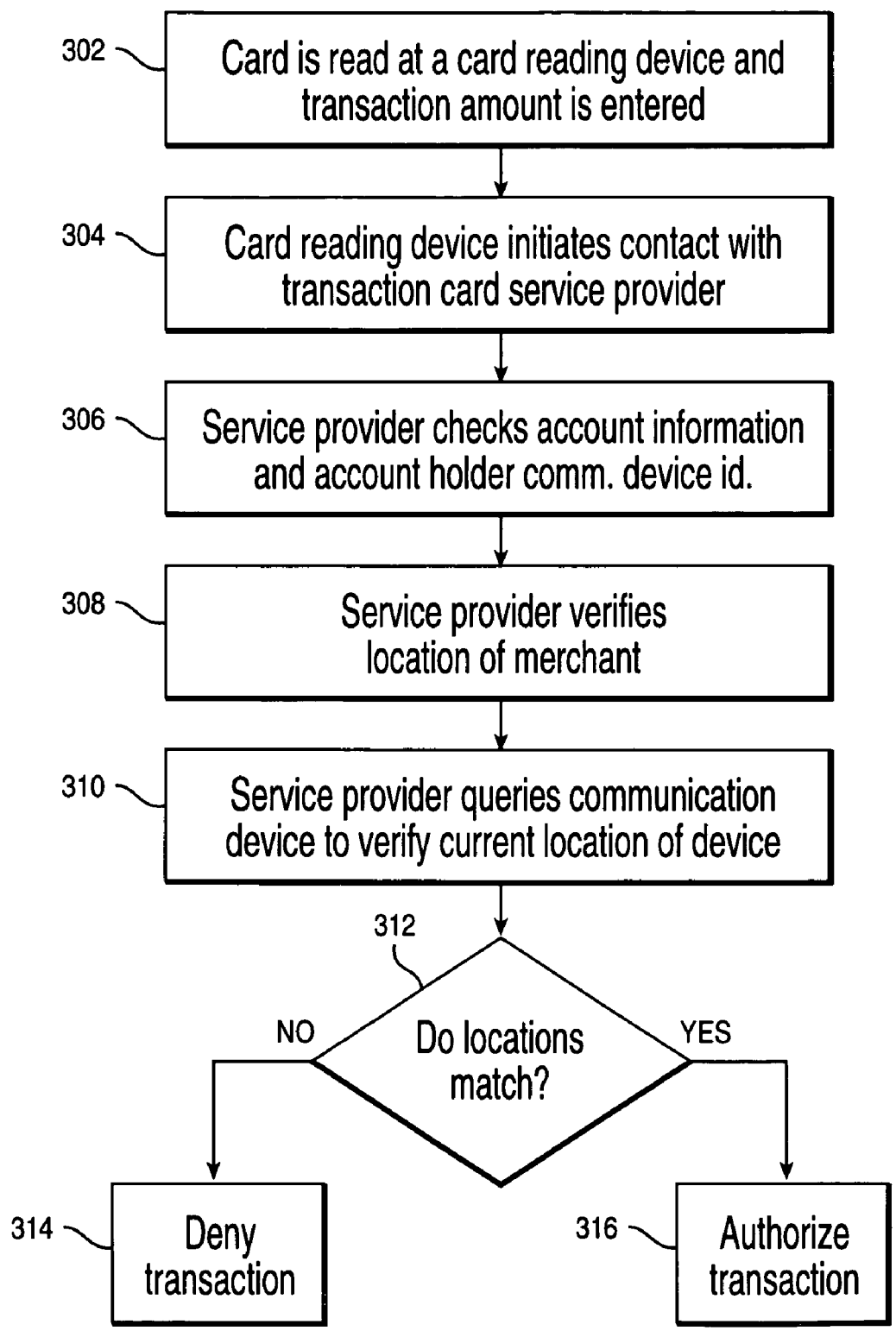
FIG. 3 is a flow chart illustrating the steps taken in one embodiment of the present invention.

FIG. 3 is a flow chart illustrating the steps generally taken in this invention when an transaction card is used for the procurement of goods, services or distribution of currency.

In a merchant setting, initially, the user of a transaction card selects merchandise or services to procure and presents the transaction card for payment. The transaction card is swiped through a card reading device and the merchant enters the transaction amount, step 302. When the transaction card is swiped through the card reading device, the card reading device is activated and initiates contact with a remote transaction card service provider, referred to as the central computer 104 in FIG. 1, at step 304. The card reader is of the type known in the art to scan the card information from an information storage media affixed to the card, e.g. magnetic strip, and initiates a phone call to a transaction card service provider. The remote transaction service provider receives the transaction card information and transaction amount as entered by the merchant at step 302 and proceeds to retrieve account information related to the transaction card at step 306. Account information includes a database containing device identification information for at least one communication device provided by the account holder. The transaction card service provider obtains the device information and queries the device to determine the location of the device, step 310. The service provider also verifies the location of the merchant in step 308. The location of the merchant may be obtained from the vendor ID submitted with the transaction request or in the alternative, the account owner may specify a substitute vendor location as described in more detail below. Steps 308 and 310 can be performed in any order. With the location information in hand, the remote transaction service provider, then determines at step 312 whether the location of the communication device matches the location of the merchant. If the locations do not match, then the transaction is denied, step 314. If the locations do match, then the transaction is authorized, step 316.

As with current systems, the account service provider may query database 108 to determine if the transaction amount has not exceeded the predetermined account holder limit. If the transaction amount exceeds the predetermined account holder spending limit, the transaction is denied.

The method of communication between the service provider and the account holder communication device may be by mobile telephone, two-way pager, or other personal communications device.

FIG. 4 is a block diagram of an exemplary communication device ID database 400 illustrated in FIG. 1 as database 106. Database 400 includes device IDs for multiple devices including the account holder's mobile phone 402, pager 404, and home phone 410. If account holders gives their transaction card to their child, for example, they may change the device ID to their child's mobile phone number. In addition, the account holder has the option of turning the device ID feature off such that the transaction will be approved regardless of the location of a given communication device.

While the invention has been particularly shown and described with reference to a preferred embodiment, it will be understood by those skilled in the art that various

We claim:

1. A computer implemented method for authorizing transactions against an account for a transaction occurring over an Internet, the computer implemented method comprising:

associating an account holder with a set of communication devices;

storing, in a database by a central computer, a set of identification numbers corresponding to the set of communication devices for the account holder, wherein each communication device from the stored set of communication devices is adapted to determine and transmit a physical location of the each communication device;

determining, by at least one communication device of the set of communication devices, a physical location of the at least one communication device, wherein the physical location is based on a location of the account holder;

transmitting the physical location of the at least one communication device to the central computer;

receiving, by the central computer, a transaction request, wherein the transaction occurs on the Internet, and wherein the transaction request comprises an account number associated with the account holder and a merchant associated with the transaction;

responsive to receiving the transaction request, obtaining, by the central computer, a location of the merchant;

receiving, from the account holder, a unique character string associated with the account holder, wherein the unique character string is changeable at random by the account holder;

responsive to receiving the unique character string from the account holder, changing, by the central computer, the merchant location to the location of the account holder to form a changed merchant location;

comparing, by the central computer, the location of the at least one communication device with the changed merchant location to form an outcome; and based on the outcome, authorizing the transaction request.

2. The computer-implemented method of claim 1, wherein comparing the location of the at least one communication device with the changed merchant location is performed by an account service provider.

3. The computer-implemented method of claim 1, wherein the each communication device from the set of communication devices comprise a global positioning system device.

4. The computer-implemented method of claim 1 wherein the set of corresponding identification numbers comprise a telephone number associated with each communication device.

5. The computer-implemented method of claim 1, wherein the single communication device is a mobile phone.

6. The computer-implemented method of claim 1, further comprising:
   determining whether the transaction is within a predefined credit limit.

7. The computer-implemented method of claim 1, wherein the transaction occurring on the Internet is for goods or services.

8. A data processing system for authorizing transactions against an account for a transaction occurring over an Internet, the data processing system comprising:
   a set of communication devices;
   a central computer, the central computer comprising:
      a memory; and
      a processing unit;
   a communication system linking the set of communication devices and the central computer, the data processing system adapted to:
      associate an account holder with a set of communication devices;
      store, in a database by the central computer, a set of identification numbers corresponding to the set of communication devices for the account holder, wherein each communication device from the stored set of communication devices is adapted to determine and transmit a physical location of the each communication device;
      determine, by at least one communication device of the set of communication devices, a physical location of the at least one communication device, wherein the physical location is based on a location of the account holder;
      transmit the physical location of the at least one communication device to the central computer;
      receive, by the central computer, a transaction request, wherein the transaction occurs on the Internet, and wherein the transaction request comprises an account number associated with the account holder and a merchant associated with the transaction;
      responsive to receiving the transaction request, obtain, by the central computer, a location of the merchant;
      receive, from the account holder, a unique character string associated with the account holder, wherein the unique character string is changeable at random by the account holder;
      responsive to receiving the unique character string from the account holder, change, by the central computer, the merchant location to the location of the account holder to form a changed merchant location;
      compare, by the central computer, the location of the at least one communication device with the changed merchant location to form an outcome; and
      based on the outcome, authorize the transaction request.

9. The data processing system of claim 8, wherein comparing the location of the at least one communication device with the changed merchant location is performed by an account service provider.

10. The data processing system of claim 8, wherein the each communication device from the set of communication devices comprise a global positioning system device.

11. The data processing system of claim 8, wherein the set of corresponding identification numbers comprises a telephone number associated with each communication device.

12. The data processing system of claim 8, wherein the single communication device is a mobile phone.

13. The data processing system of claim 8, further comprising:
   determining whether the transaction is within a predefined credit limit.

* * * * *